US008874849B2

(12) United States Patent
Solihin

(10) Patent No.: US 8,874,849 B2
(45) Date of Patent: Oct. 28, 2014

(54) SECTORED CACHE WITH A TAG STRUCTURE CAPABLE OF TRACKING SECTORS OF DATA STORED FOR A PARTICULAR CACHE WAY

(75) Inventor: Yan Solihin, Apex, NC (US)

(73) Assignee: Empire Technology Development LLC, Wilmington, DE (US)

( * ) Notice: Subject to any disclaimer, the term of this patent is extended or adjusted under 35 U.S.C. 154(b) by 96 days.

(21) Appl. No.: 13/498,071

(22) PCT Filed: Apr. 21, 2010

(86) PCT No.: PCT/US2010/031878
§ 371 (c)(1),
(2), (4) Date: Mar. 23, 2012

(87) PCT Pub. No.: WO2011/133146
PCT Pub. Date: Oct. 27, 2011

(65) Prior Publication Data
US 2012/0317361 A1   Dec. 13, 2012

(51) Int. Cl.
G06F 13/00   (2006.01)
G06F 13/28   (2006.01)
G06F 12/08   (2006.01)

(52) U.S. Cl.
CPC ........ *G06F 12/0864* (2013.01); *G06F 12/0895* (2013.01); *G06F 2212/608* (2013.01); *G06F 12/0871* (2013.01)
USPC ........................................... 711/128; 711/129

(58) Field of Classification Search
CPC ............ G06F 12/0886; G06F 12/0851; G06F 12/0871; G06F 12/0864
See application file for complete search history.

(56) References Cited

U.S. PATENT DOCUMENTS 4,493,026 A * 1/1985 Olnowich ...................... 711/128
5,202,969 A    4/1993 Sato et al.
(Continued)

FOREIGN PATENT DOCUMENTS

| JP | H02171944 A | 7/1990 |
| JP | 05314008 | 11/1993 |
| KR | 1020090072933 | 7/2009 |
| WO | 2009037912 A1 | 3/2009 |

OTHER PUBLICATIONS

Rogers, B. et al., Scaling the Bandwidth Wall: Challenges in and Avenues for CMP Scaling, Proc. of the International Symposium on Computer Architecture, 2009, 12 pages.

(Continued)

*Primary Examiner* — April Y Blair
*Assistant Examiner* — Michael C Kolb
(74) *Attorney, Agent, or Firm* — Moritt Hock Hamroff LLP; Steven S. Rubin, Esq.

(57) ABSTRACT

Technologies are generally described for a system for copying particular data in a particular sector of a particular block from a memory into a cache, in some examples, the cache includes a tag array and a data array. In some examples, a processor may be adapted to copy data in the particular sector from the memory into a way of the data array starting at a start sector. In some examples, the processor may be adapted to update the tag array to identify the particular sector. In some examples, the processor may be adapted to update the tag array to identify the way in the data array, in some examples, the processor may be adapted to update the tag array to identify the start sector.

20 Claims, 5 Drawing Sheets

(56) References Cited

U.S. PATENT DOCUMENTS

| | | | |
|---|---|---|---|
| 6,643,743 B1* | 11/2003 | Hum et al. | 711/137 |
| 6,678,790 B1* | 1/2004 | Kumar | 711/118 |
| 6,766,431 B1 | 7/2004 | Moyer | |
| 7,526,610 B1* | 4/2009 | Emma et al. | 711/128 |
| 8,583,872 B2 | 11/2013 | Yamamura et al. | |
| 2002/0087809 A1* | 7/2002 | Arimilli et al. | 711/144 |
| 2009/0172289 A1* | 7/2009 | Yamamura et al. | 711/128 |
| 2011/0010503 A1* | 1/2011 | Yamamura et al. | 711/128 |

OTHER PUBLICATIONS http://www.edn.com/article/CA6686259.html?title=Article&spacedesc=news&nid=3927, downloaded Sep. 10, 2012, 2 pages.

Guz, Z. et al., Nahalal: Cache Organization for Chip Multiprocessors, IEEE Computer Architectures Letters, vol. 6, Jan. 1-Jun. 21-24, 2007.

International Search Report and Written Opinion for application with No. PCT/US10/31878 dated Dec. 1, 2011.

* cited by examiner

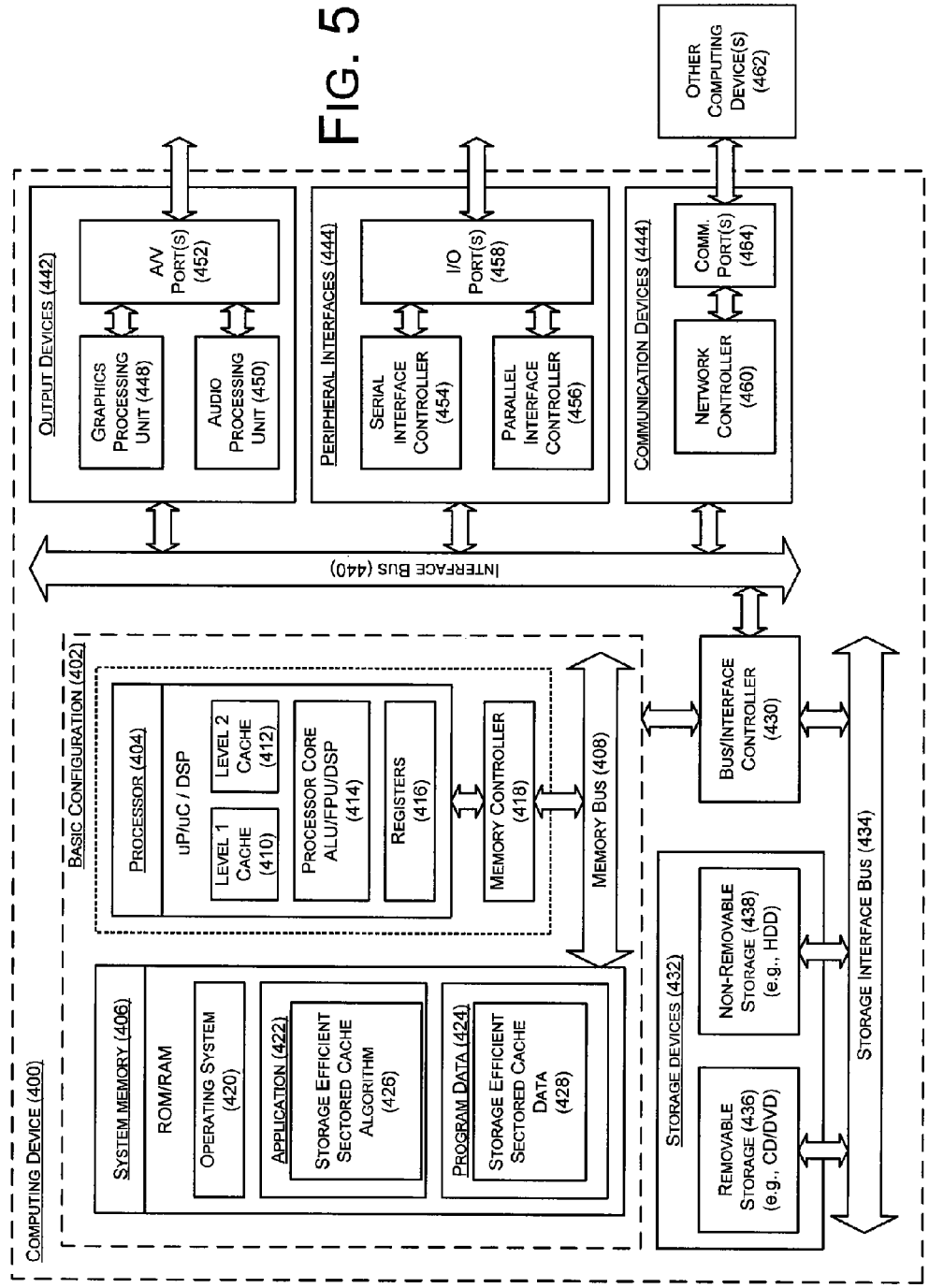

SECTORED CACHE WITH A TAG STRUCTURE CAPABLE OF TRACKING SECTORS OF DATA STORED FOR A PARTICULAR CACHE WAY

CROSS REFERENCE TO RELATED APPLICATIONS

This application is a 371 of International Application No. PCT/US2010/031878 filed Apr. 21, 2010, the entirety of which is hereby incorporated by reference.

BACKGROUND

Unless otherwise indicated herein, the materials described in this section are not prior art to the claims in this application and are not admitted to be prior art by inclusion in this section.

A cache may be used to store data for access by one or more of the processors or processor cores. The data can be a copy of data stored in a larger memory that is typically located outside of the chip with the cache. In the cache, the copy of the data may be stored in a data array. A tag array may maintain an index of the data stored in the data array. A processor may request particular data stored in the cache by identifying an address. The address is compared with addresses in the to array to determine whether a copy of the particular data is stored in the data array of the cache.

SUMMARY

In one example, a method is described for copying particular data in a particular sector of a particular block from to memory into a cache. In some examples, the cache may include a tag array and a data array. In some examples, the method may include copying, by a processor, the particular data in the particular sector from the memory into a way of the data array starting at a start sector. In some examples, the method may further include updating, by the processor, the tag array to identify the particular sector. In some examples, the method may further include updating, by the processor, the tag array to identify the way in the data array. In some examples, the method may further include updating, by the processor, the tag array to identify the start sector.

In another example, a system is described for copying particular data in a particular sector of a particular block. In some examples, the system includes a cache including a tag array and a data array. In some examples, the system further includes a memory and a processor configured to be in communication with the cache and with the memory. In some examples, the processor may be effective to copy the particular data in the particular sector horn the memory into a way of the data array starting at a start sector. In some examples, the processor may be further effective to update the tag array to identify the particular sector. In some examples, the processor may be further effective to update the tag array to identify the Way of the data array. In some examples, the processor may be further effective to update the tag array to identify the start sector.

In yet another example, a method is described for retrieving a copy of particular data in a particular sector stored in a cache based on an address. In some examples, the address includes a tag field, a set index field, and a sector index field. In some examples, the cache includes a tag array and a data array. In some examples, the method includes comparing, by a processor, first tag data in the tag field, in a set identified in the set index field, with second tag data in another tag field in the tag array to produce a matching tag. In some examples, the matching tag is in a tag structure. In some examples, the tag structure includes a sector bit vector field, a way field, and a start sector field. In some examples, the method further includes comparing, by the processor, sector bit vector data in the sector bit vector field of the tag structure with data in the sector index field of the address to determine that the copy of the particular data in the particular sector is stored in the cache. In some examples, the method further includes analyzing, by the processor, data in the way field to determine a way in the data array where the copy of the particular data in the particular sector is stored. In some examples, the method further includes analyzing, by the processor, data in the start sector field to determine a starting sector in the data array where the copy of the particular data in the particular sector is stored. In some examples, the method further includes retrieving, by the processor, the copy of the particular data in the way, set and starting sector of the data array.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 5 is a block diagram illustrating an example computing device that is arranged to implement a storage efficient sectored cache;

Figure 1:
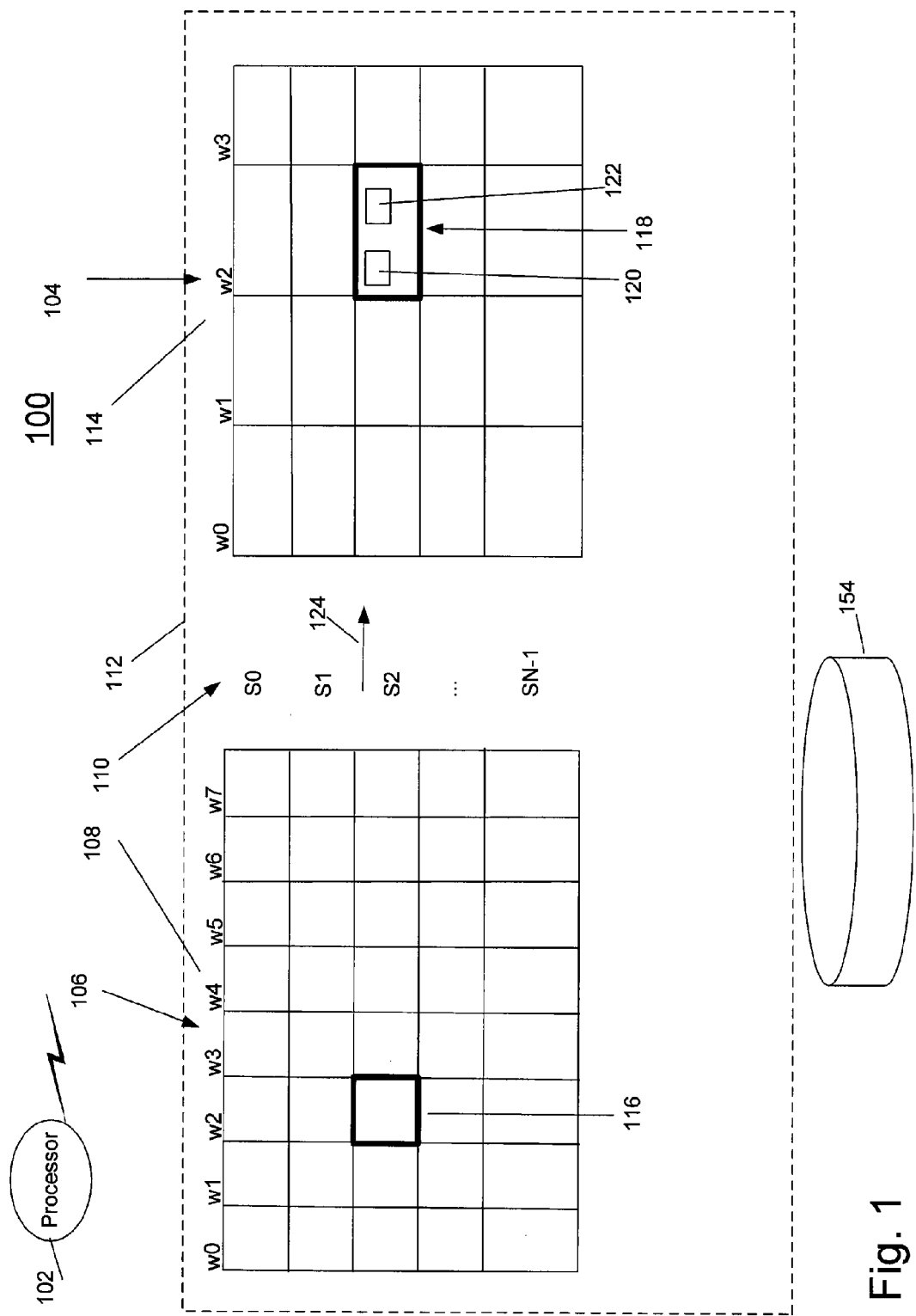
FIG. 1 illustrates an example system that can be utilized to implement a storage efficient sectored cache.

all arranged according to at least some embodiments presented herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to implementing a storage efficient sectored cache.

Briefly stated, technologies are generally described lot a system for copying particular data in a particular sector of a particular block from a memory into a cache. In some examples, the cache includes a tag array and a data array. In some examples, a processor may be adapted to copy data in the particular sector from the memory into a way of the data array starting at a start sector. In some examples, the processor may be adapted to update the tag array to identify the particular sector. In some examples, the processor may be adapted to update the tag array to identify the way in the data array. In some examples, the processor may be adapted to update the tag array to identify the start sector.

FIG. 1 illustrates an example system that can be utilized to implement a storage efficient sectored cache arranged according to at least some embodiments presented herein. An example system 100 may include a processor 102 configured to be in communication with a cache 112 and to memory 154. Cache 112 may include a tag array 106 and a data array 104. In some examples, data array 104 could be implemented using DRAM (dynamic random access memory) and tag array 106 could be implement using SRAM (static random access memory) or DRAM.

Tag array 106 may be configured to include multiple tag structures 116 arranged in multiple ways or columns 108 and multiple sets or rows 110. In some examples, data array 104 may be configured to include multiple cache lines 118 arranged in the same number of sets 110 and a different number of ways 114. For example, as shown, tag array 106 and data array 104 may both include N sets. In the example shown, tag array 106 includes 8 ways and data array 104 includes 4 ways.

As is explained in more detail below, tag structure 116 may be configured to map or index (as illustrated by mapping arrow 124) where sectors 120, 122 include data stored in data array 104. Sectors 120, 122 may include copies of data from distinct data blocks in memory 154. Processor 102 may be adapted to store data in cache lines 118 of data array 104 and to store tag structures 116 in tag array 106. In examples when data front distinct data blocks are stored in a single cache line, tag structure 116 may be adapted to indicate a location of a set, way (column) and starting sector where the data is stored in data array 104. Similarly, processor 102 may be configured to generate requests for data stored in data array 104 by generating and comparing addresses with tag structures 116 in to array 106. Among other benefits, by storing and indexing copies of data from multiple distinct blocks in the an cache line, efficient cache storage may be realized.

Figure 2:
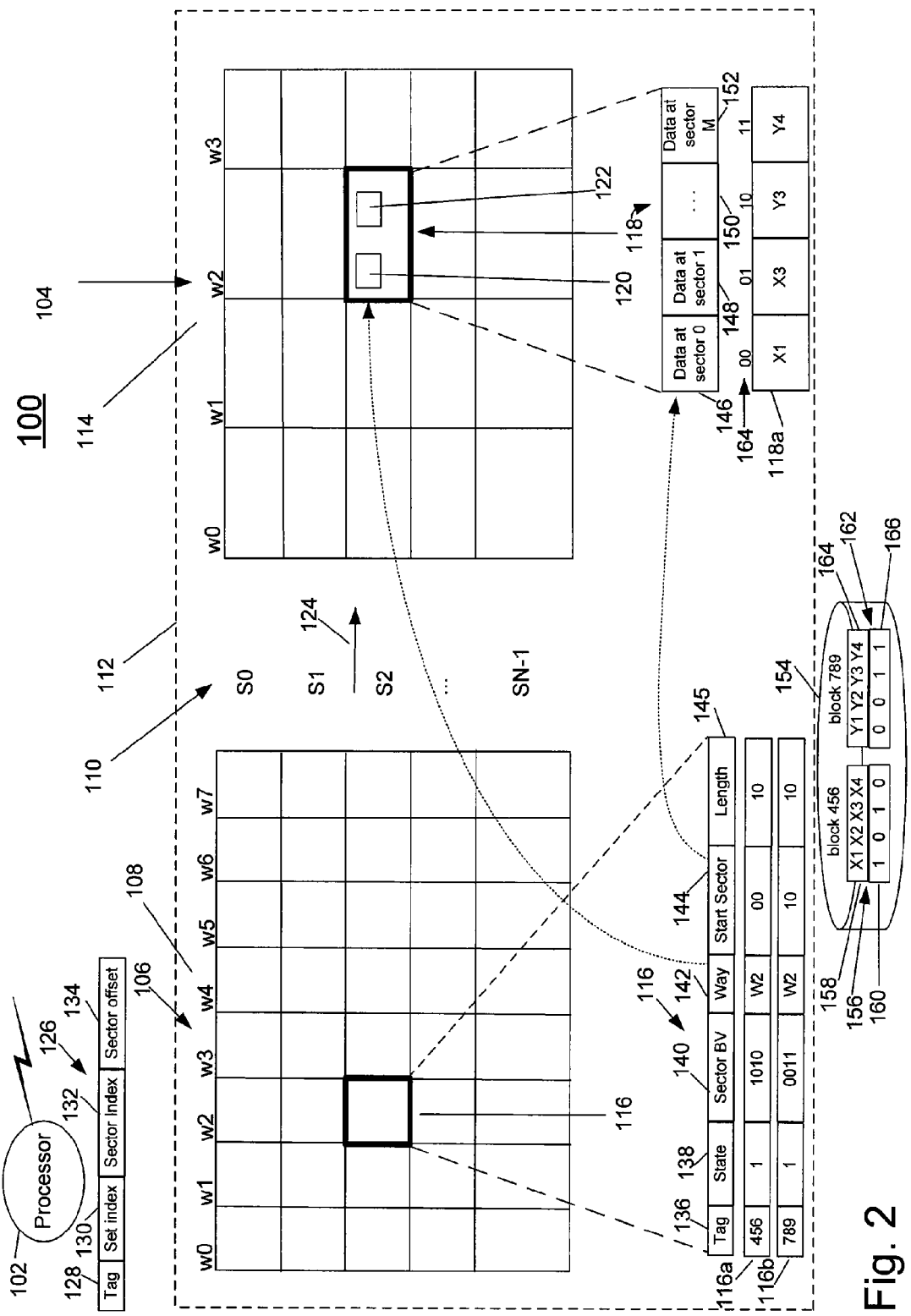
FIG. 2 illustrates an example system that can be utilized to implement a storage efficient sectored cache.

FIG. 2 illustrates an example system that can be utilized to implement a storage efficient sectored cache arranged according to at least some embodiments presented herein. FIG. 2 is substantially similar to system 100, with additional details. Those components in FIG. 2 that are labeled identically to components of FIG. 1 will not be described again for the purposes of clarity.

As shown in FIG. 2, processor 102 may be configured to generate an address 126 identifying a location of data that may be stored in cache 112. Address 126 may include fields such as a tag 128, a set index 130, a sector index 132, and a sector offset 134. Each tag structure 116 in tag array may be configured to include fields such as a tag 136, a state 138, a sector bit vector 140, a way 142, a start sector 144, and/or a length 145. Some uses of these fields will be explained below. Each cache line 118 in data array 104 may be configured to include M sectors as shown at 146, 148, 150 and 152. In some examples, 64 sectors may be used in cache line 118.

In examples were processor 102 requests particular data in particular sectors of particular blocks, processor 102 may be configured to generate address 126 for the particular data. Set index 130 of address 126 may indicate the set or row that processor 102 may read in tag array 106 for a tag identified in tag field 128. In the example shown, set S2 is identified in address 126. In the example, once the set is identified, processor 102 may be configured to compare tags in was (columns) in set S2 for the tag identified in tag field 128. If there is no match between the data in tag field 128 and data in tag fields 136 in any one of the ways in set S2, processor 102 may be configured to determine that there is a block miss. Data in a sector of the requested data may then the retrieved from memory 154 and stored in cache 112 in locations defined by a replacement policy. For example, data with an oldest time stamp, data not accessed within a defined time period, or data that is least recently used, may be overwritten with a copy of the requested data.

In examples where processor 102 determines a match between data in to field 128 and data in one of the tag fields 136, processor 102 may be configured to read data in state field 138. Data in state field 138 may indicate whether the state of the data is valid in light of cache coherence protocols. If the state is not valid, processor 102 may be configured to determine that a cache miss has occurred. If the state is valid, processor 102 may be configured to compare data in sector index field 132 with data in sector bit vector field 140 to determine whether a copy of data in the particular sector is stored in data array 104. For example, a bit in sector hit vector 140 may indicate whether a copy of data in the particular sector is stored in data array 104. If data in sector bit vector 140 indicates that a copy of the data in the particular sector is not stored in data array 104, processor 102 may be configured to determine that there is a sector miss. In response to a sector miss, processor 102 may be configured to retrieve data in the particular sector from memory 154 tend copy it in cache 112 based on a replacement policy (discussed herein).

In examples where a copy of the data in the particular sector is determined to the present in cache 112, processor 102 may be configured to read data in way field 142. Way field 142 may indicate the way or column in data array 104 where the copy of the data in the particular sector is stored. Data in sectors of multiple distinct blocks with different tag lines may be mapped in tag array 106 to the same way 114 and cache line 118 in data array 104. Processor 102 may be configured to read data in start sector field 144 to determine the starting sector in cache line 118 where the copy of the data in the particular sector is stored. Processor 102 may be configured to read data in length field 145 to determine how many sectors the particular data may occupy and/or reserve. For example, the particular data may occupy two sectors in data array 104 and a total of four sectors may be reserved for related data. The occupied and reserved sectors may be identified in length field 145. In this example, if processor 102 accesses two new sectors of the same block, data in those two new sectors may be stored using an existing reservation defined in length field 145 rather than causing an eviction of data of a different block. After the starting sector is determined from start sector field 144, processor 102 may be configured to locate a byte/word in sector offset field 134 of address 126.

Data from memory 154 may be stored efficiently in cache 112, in examples where processor 102 determines a block or sector miss (discussed above), or when cache 112 is first populated with data, data may be copied by processor 102 from memory 154 to data array 114. An entire block of data need not necessarily be copied to data array 114 because the requested particular sector itself can be copied. In examples where sectors including data from multiple distinct blocks may fit into a single cache line, those sectors with data may be stored in the same cache line. For example, when a particular sector is accessed by processor 102, that sector and a next consecutive sector or sectors could be copied. In another example, processor 102 may be configured to use a sector prefetcher. The sector prefetcher may be configured to detect consecutive accesses for data in sectors and prefetch the particular sector and the next few sectors. The next few sectors may be consecutive or separated by a stride. In some examples, bad on historical data the prefetcher may also be configured to determine how many sectors should be reserved in data array 104 using length field 145. In another example, processor 102 may be configured to monitor the past usage of data in a block such as how many sectors were accessed in the past for this block. Based on this information, processor 102 may be configured to reserve the same number of sectors for the block as was accessed in the past.

In some examples, sectors with data IN addition to the particular sector may be reserved or copied from memory 154 to cache 112 based on predictive algorithms. In these examples, processor 102 may be configured to maintain historical information of data in sectors and blocks copied from memory 154. For example, historically, certain sectors including data may be typically copied from memory 154 to cache 112 together (such as consecutive sectors) or a copying of one sector with data may suggest that a related sector should also be copied. With this historical information, a sector miss for one of these related sectors may indicate that processor 102 should be configured to copy related sectors with data. For example, processor 102 may be configured to use a prediction structure that can keep track of the usage of more blocks than what cache 112 can store. In an example, the prediction structure may include a table indexed with a block address and a counter effective to record the number of "1"s in the block's sector bitvector 140, when the block is evicted from the cache. When processor 102 determines that there is a block miss, processor 102 ma be configured to check the table. The counter may be used by processor 102 to determine a number of sectors to reserve for the block.

In an example, memory 154 may include data in blocks 156 and 162 that may be copied into data array 114 of cache 112 upon a request by processor 102, In the example, block 156 has the tag "456" and includes four sectors 158 (X1, X2, X3, and X4). In the example, data is stored in sectors X1 and X3 (as indicated by the bits 1 0 1 0 of data bit vector 160). In the example, block 162 has the tag "789" and includes four sectors 162 (Y1, Y2, Y3, and Y4). In the example, data is stored in sectors Y3 and Y4 (as indicated by bits 0 0 1 1 in data bit vector 166). Copying and storing all sectors of blocks 156 and 162 would result in 8 total sectors and multiple cache lines 118 being allocated and used in data array 114. This is true even though no data is currently stored in sectors X2, X4, Y1 and Y2.

Processor 102 may be adapted to copy data from those sectors 158, 164 where data is currently stored from memory 154 into data array 114. In the example, data in sectors X1 and X3 of block 156 are copied to a data line 118a. Data line 118a includes four sectors with four cache line sector numbers 164 (numbering 00, 01, 10, 11). As data from only two sectors (X1 and X3) of block 158 are copied from memory 154 to data array 114, data line 118a has room for data in two other sectors. Data in sectors Y3 and Y4 in block 162 may also be copied to data line 118a. In some examples, processor 102 may be configured to reserve a preset number of consecutive sectors that are likely needed for a block. For example, if there are 64 sectors in a cache line 118, and tag array 106 can hold twice as many lines as data array 104, then processor 102 can reserve 32 sectors for each new block by default. In another example, as discussed above, a prediction table may be used that records the past usage of a block. In this example, processor 102 may be configured to reserve a number of sectors as was used for the block in the past, rounded up to the minimum number of sectors that can be reserved. For example, the minimum number could be a multiple of 16 or 32.

In the example, processor 102 may be configured to update tag array 108 to reflect the copying of blocks 156 and 162. As shown in the example, a first tag structure 116a may be used to index block 156. In the example, processor 102 may be configured to store the to "456" in tag field 136, and to store a valid state (e.g. "1") in state field 138. In the example, processor 102 may be configured to update data in sector bit vector 140 to include the bit vector "1010" indicating which sectors of block 156 include data stored in data array 104.

In the example, block 156 is mapped to way w2 of data array 104. As data in sectors from multiple distinct blocks may be mapped to the same cache line and way, tag structure 116a also includes a start sector field 144. In this example, block 156 with tag "456" starts at cache line sector number 164 with a value of 00 and so processor 102 may be configured to store "00" in start sector field 144. There is data in two sectors of block 156 and so processor 102 may be configured to store "10" in length field 145.

Similarly, in the example, a second tag structure 116b may be used to index block 162. Tag structure 116b may be stored in a different tag entry as tag structure 116a. Processor 102 may be configured to store the tag "789" in tag field 136 and to store a valid state (e.g. "1") in state field 138. In the example, processor 102 may be configured to update data in sector bit vector 140 to include the bit vector "0011" indicating which sectors of block 162 include data stored in data array 104.

In the example, block 162 is mapped to way w2. As data in sectors from multiple distinct blocks may be mapped to the same cache line and way, tag structure 116b also includes a start sector field 144. In this example, block 162 with tag "789" starts at cache line sector number 164 with a value of 10 and so processor 102 may be configured to store "10" in start sector 144. There is data in two sectors of block 162 and so processor 102 may be configured to store "10" in length field 145.

In the example, if data was stored in sector X2 of block 156, then block 156 and 162 may not be able to fit in the same cache line 118a. In such an example, another cache line may be used to store blocks 156, 162. For example, processor 102 may be configured to read tag array 106 and look for data in a victim block with a desired number of sectors to store data from block 156, 162. Data from the victim block may be chosen by processor 102 to be evicted from cache 112. After evicting data from the victim block, processor 102 may be configured to copy data from block 156, and/or 162 to occupy the space in data array 104 freed by data from the victim block. In another example, processor 102 may be configured to read tag array 106 to see if there is data from another block stored in the same cache line consecutive to data in block 156, 162. Such data may be evicted, and processor 102 may be configured to expand the storage of block 156, 162 to consecutive sectors. In other examples, based on a replacement policy used by processor 102, older data stored in cache line 118a may be evicted to allow for storage of newer data. Processor 102 may be configured to limit the number of distinct data blocks that may be stored in a single cache line 118. For example, to simplify tag array 106, processor 102 may be configured to limit the number of different blocks (e.g. to 2 or 4 blocks) that can b stored in a single cache line. In such an example, data in start sector field 144 may be encoded with fewer bits identifying one of the allowed start sectors based on the number of allowed blocks in the cache line. Data in start sector field 144 may indicate whether a particular block uses ¼, ½ or an entire cache line.

Among other possible benefits, in system 100, cache 112 allows for storage of data from multiple, distinct, blocks in a single cache line. Storage of a single block of data need not necessarily require allocating an entire cache line in data array 104. Space may be allocated in the data array for sectors with data stored therein instead of allocating space for all sectors in a block regardless of whether there is data in those sectors. Rather than 1 to 1 mapping between tag structures 116 and cache line 118, system 100 allows for in some examples, many or n to 1 mapping between tag structures 116 and cache lines 118. For example, tag structures 116 in way w2 and way w5 in tag array 108 may both map to a cache line 118 in way w2 at data array 104 based on data in way field 142. More flays columns may be used in tag array 108 than used in data array 104 because multiple distinct, blocks of data may share the same cache line in data array 104. In some examples, by copying sectors with data stored therein, storage fragmentation in a cache may be limited even in caches with a relatively large cache size. In some examples, system 100 avoids partially populating cache lines in data array 104. The above may result in, among other benefits, higher performance and better energy efficiency—as is explained below.

As a consequence, at least in part of limiting storage fragmentation, a cache can hold more data blocks. By increasing effective cache capacity, a cache miss rate may be reduced because more blocks may be found in the cache rather than being retrieved horn another memory. Data traffic may be reduced allowing more cores to be implemented without hitting a bandwidth envelope of the chip with the cache. As data from multiple blocks may share a single cache line, the cache line may be accessed more frequently. A DRAM cache line may lose its charge if not refreshed. Multiple accesses to the cache line may mean that less refreshes of the DRAM may be used.

As an example of increased efficiency using system 100, in a 32 MB sectored cache with 4 KB lines and 8 way associativity, 8,192 cache lines may be used along with a tag array of 128 KB (64 KB fir tags and 64 KB for sector bit vectors). If each 4 KB line is half filled, the effective cache capacity is only 16 MB. Tag structure 116 includes a way field (which in seine examples may be 3 bits) indicating where a cache line is located. Tag structure 116 may include a starting sector field (which some examples may be 1 bit) indicating a starting sector. Tag structure 116 may include a length field (which in some examples may be 1 bit) indicating a maximum number of sectors that the block may be allowed to occupy. In the example, the extra fields in tag structure 116 totals 5 extra bits in the tag array totaling 5 KB of extra tag storage (4% increase) and an effective cache capacity of 32 MB (100% increase).

Figure 3:
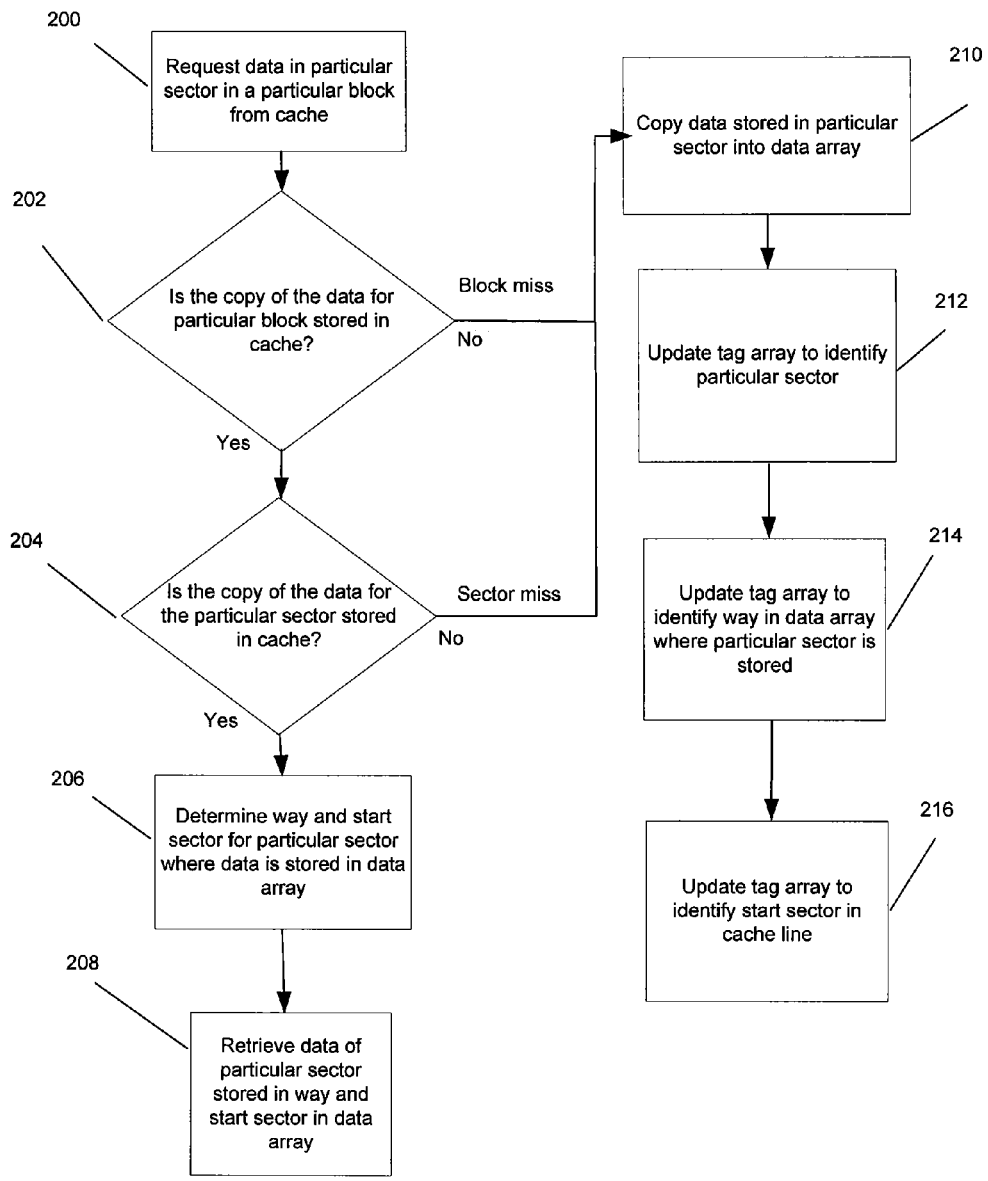
FIG. 3 depicts a flow diagram for an example process for implementing a storage efficient sectored cache.

FIG. 3 depicts a flow diagram for an example process for implementing a storage efficient sectored cache arranged according to at least some embodiments presented herein. In some examples, the process in FIG. 3 could be implemented using system 100 discussed above. An example process may include one or More operations, actions, or functions as illustrated by one or more of blocks 200, 202, 204, 206, 208, 210, 212, 214 and or 216. Although illustrated as discrete blocks, various blocks may be divided into additional blocks, combined into fewer blocks, or eliminated, depending on the desired implementation. Processing may begin at block 200.

At block 200 a processor may be configured to request data in a particular sector in a particular block from a cache. Processing may continue from block 200 to block 202.

At block 202 the processor may be configured to determine whether a copy of data for the particular block is stored in the cache. In some examples, this may be performed by analyzing a tag and/or state field in a tag array. If the block is not present in the cache ("NO"), the processor may be configured to determine that a cache miss has occurred and processing may continue from block 202 to block 210.

If at block 202, the processor determines that the block is present in the cache (YES), processing may continue from block 202 to block 204. At block 204, the processor may be configured to determine whether a copy of the data in the particular sector is stored in the cache. In some examples, this may be performed by analyzing as sector bit vector. If data for the particular sector is not stored in the cache ("NO"), the processor may be configured to determine that a sector cache miss has occurred and processing may continue from block 204 to block 210.

If at block 204 the processor determines that a copy of the data in the particular sector is present in the cache ("YES"), processing may continue from block 204 to block 206. At block 206, the processor may be configured to determine the way and start sector of where the copy of the data in the particular sector is stored in a data array of the cache. In some examples, this may be performed by analyzing data in way and start sector fields. Processing may continue from block 206 to block 208. At block 208, the processor may be configured to retrieve the copy of the data of the particular sector stored in the way and start sector of the data array at an appropriate sector by consulting a sector bit vector.

At block 210, after a block miss at block 202 or after a sector miss at block 204, the processor may be configured to copy data stored in the particular sector from another memory into a cache line of the data array of the cache. The data stored in the particular sector may be copied into a cache line including data from other distinct blocks. Processing may continue from block 210 to block 212.

At block 212, the processor may be configured to update a tag array of the cache to identify the particular sector including data stored in the data array. In some examples, this could be performed by updating a sector bit vector field. Processing may continue from block 212 to block 214.

At block 214, the processor may be configured to update a tag array of the cache to identify the way where the particular sector including data is stored in the data array. In some examples, this could be performed by updating a way field. Processing may continue from block 214 to block 216.

At block 216, the processor may be configured to update a tag array of the cache to identify a start sector in the cache line where the particular sector including data is stored in the data array. In some examples, this could be performed by updating a start sector field.

Figure 4:
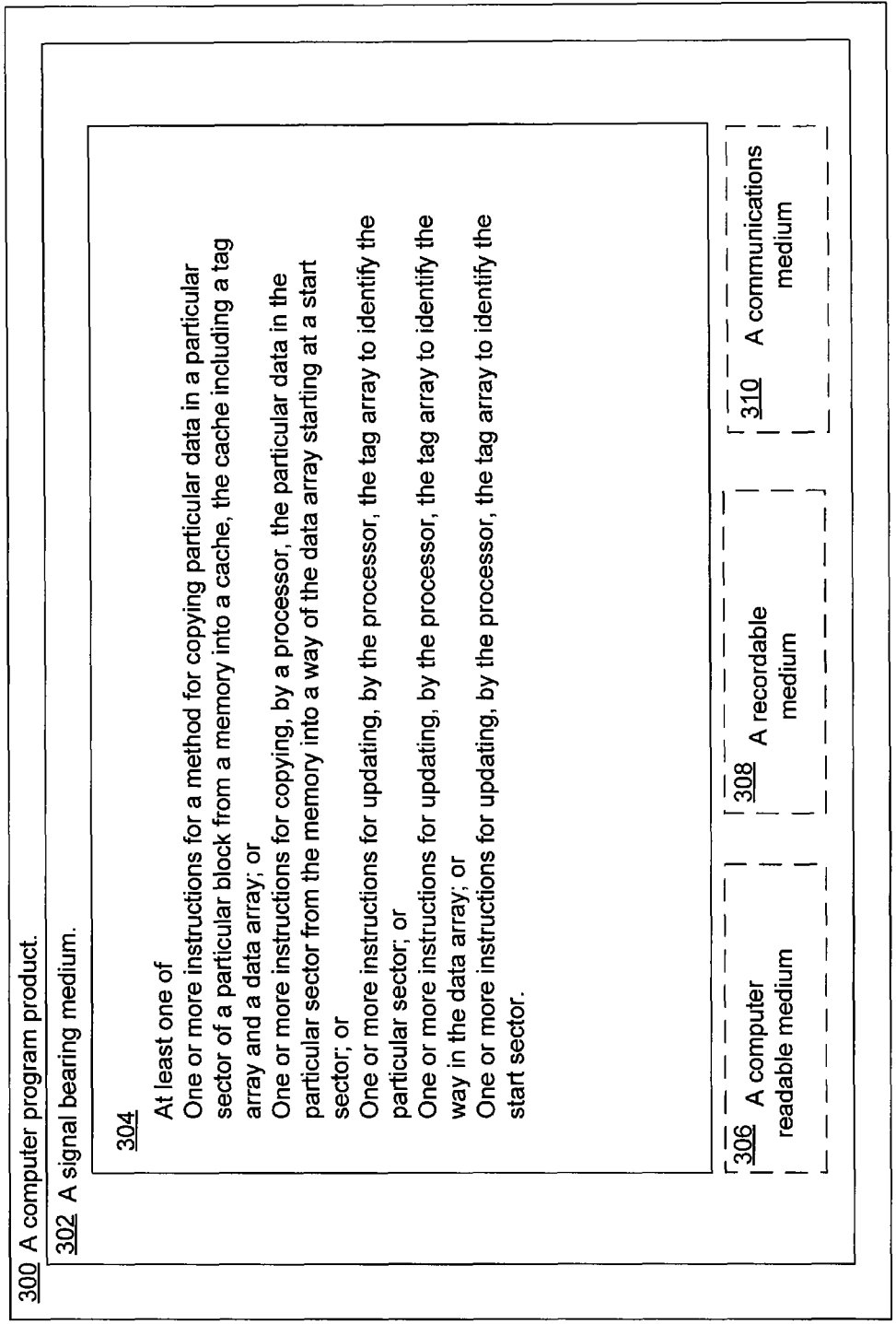
FIG. 4 illustrates an example computer program product for implementing a storage efficient sectored cache.

FIG. 4 illustrates an example computer program product 300 arranged according to at least some embodiments presented herein. Program product 300 may include a signal bearing medium 302. Signal bearing medium 302 may include one or more instructions 304 that, when executed by, for example, a processor, may provide the functionality described above with respect to FIGS. 1-3. Thus, for example, referring to system 100, processor 102 may undertake one or more of the blocks shown in FIG. 4 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to memory, read/write (R/W) CDs, R/W DVDs, etc. In some implementations, signal bearing medium 102 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules oil the system 100 by an RF signal bearing medium 302, where the signal bearing medium 302 is conveyed by a wireless communications medium 310 (e.g., a wireless communications medium conforming with the IEEE 802.11 standard).

FIG. 5 is a block diagram illustrating an example computing device 400 that is arranged to implement a storage efficient sectored cache according to at least some embodiments presented herein. In a very basic configuration 402, computing device 400 typically includes one or more processors 404 and a system memory 406. A memory bus 40 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc) or any combination thereof. System memory 406 may include an operating system 420, one or more applications 422, and program data 424. Application 422 may include a storage efficient sectored cache algorithm 426 that is arranged to perform the functions as described herein including those described with respect to system 100 of FIG. 2. Program data 424 may include storage efficient sectored cache data 428 that may be useful for a storage efficient sectored cache algorithm as is described herein. In some embodiments, application 422 may be arranged to operate with program data 424 on operating system 420 such that a storage efficient sectored cache algorithm may be provided. This described basic configuration 402 is illustrated in FIG. 5 by those components within the inner dashed line.

Computing device 400 may have additional features or functionality, and additional interlaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such is computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of as communication media. Communication media may typically be embodied by computer readable instructions, data structures, program modules, or other data in as modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is lot the purpose of describing particular embodiments only, and is not intended to be limiting.

With respect to the use of substantially any plural and/or singular terms herein, those having skill in the art can translate from the plural to the singular and/or from the singular to the plural a is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the an that if at specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a churn recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and or in should be interpreted to mean at least one or "one or more"); the same holds true for the use of definite articles used to introduce claim recitations. In addition, even if as specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one has mg skill in the art is understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the in will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third middle thud and upper third, etc. As will also be understood by one skilled in the art all language such as "up to "at least," "greater than," less than," and the like include the number recited and refer to ranges which can be subsequently broken down into subranges a discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and in not intended to be limiting with the true scope and spirit being indicated by the following claims.

What is claimed is:

1. A method for copying a block from a memory into a cache, the block including data stored in at least a first sector and a second sector in the memory, where the first and second sectors are non-consecutive sectors, the cache including a tag array and a data array, the tag array effective to map where data from the memory is stored in the data array, the method comprising:

copying, by a processor, first data in the first sector of the block from the memory into a start sector of a way of the data array;

copying, by a processor, second data in the second sector of the block from the memory into a next sector of the way of the data array, wherein the next sector is consecutive to the start sector; and in response to the copying of the first and second data:

updating, by the processor, the tag array to identify the first and second data as being stored in the data array;

updating, by the processor, the tag array to identify the first and second data as being stored in the way in the data array;

updating, by the processor, the tag array to identify the start sector in the way of the data array; and updating, by the processor, the tag array to store a length that corresponds to a number of sectors that store the first data and the second data in the cache.

2. The method as recited in claim 1, further comprising, prior to the copying, determining by the processor that a copy of the block is not stored in the cache.

3. The method as recited in claim 2, wherein determining by the processor that the copy of the block is not stored in the cache includes comparing a tag field of a request for the block with a tag field in the tag array.

4. The method as recited in claim 3, further comprising, prior to the copying, determining by the processor that a copy of the first data is not stored in the cache.

5. The method as recited in claim 4, wherein determining by the processor that the copy of the first data is not stored in the cache includes comparing a sector index field of the request with a sector bit vector field in the tag array.

6. The method as recited in claim 5, wherein the sector bit vector field in the tag array indicates copies of sectors of the block that are stored in the data array.

7. The method as recited in claim 1, wherein:
the block is a first block;
the way is a first way;

the start sector is a first start sector;
the next sector is a first next sector;
the length is a first length;
the number is a first number; and the method further comprises:
copying, by the processor, third data in a third sector from the memory into a second start sector of a second way of the data array, wherein the third sector is stored in the memory in a second block, and wherein the second block is distinct from the first block;
copying, by the processor, fourth data in a fourth sector from the memory into a second next sector of the second way of the data array, wherein the fourth sector is stored in the memory in the second block, the fourth sector is non-consecutive to the third sector, and the second next sector is consecutive to the second start sector; and in response to the copying of the third and fourth data:
updating, by the processor, the tag array to identify the third and fourth data as being stored in the data array;
updating, by the processor, the tag array to identify the third and fourth data as being stored in the second way in the data array;
updating, by the processor, the tag array to identify the second start sector in the second way of the data array; and
updating, by the processor, the tag array to store a second length that corresponds to a second number of sectors that store the third and fourth data in the cache.

8. The method as recited in claim 7, wherein the first and second way are distinct.

9. The method as recited in claim 1, wherein copying includes analyzing the block, copying data in the first and second sectors of the block where data is stored in the memory, and not allocating space in the data array for remaining sectors different from the first and second sectors of the block where data is not stored in the memory.

10. The method as recited in claim 7, wherein:
copying, by the processor, data in the first and second sectors includes analyzing the first block, copying data in the first and second sectors of the first block where data is stored in the memory, and not allocating space in the data array for first remaining sectors different from the first and second sectors of the first block where data is not stored in the memory; and
copying, by the processor, data in the third and fourth sectors includes analyzing the second block, copying data in the third and fourth sectors of the second block where data is stored in the memory, and not allocating space in the data array for second remaining sectors different from the third and fourth sectors of the second block where data is not stored in the memory.

11. The method as recited in claim 1, wherein copying includes copying data in the first and second sectors and related sectors.

12. The method as recited in claim 1, further comprising updating, by the processor, the tag array to indicate a number of sectors reserved for the first and second data in the data array.

13. The method as recited in claim 1, further comprising selecting, by the processor, the way and start sector based on a replacement policy.

14. A system effective to copy a block from a memory into a cache, the block including data stored in at least a first sector and a second sector in the memory, where the first and second sectors are non-consecutive sectors, the system comprising:
a memory;
a cache including a tag array and a data array, the tag array effective to map where data from the memory is stored in the data array; and
a processor configured to be in communication with the cache and with the memory, wherein the processor is effective to:
copy first data in the first sector of the block from the memory into a start sector of a way of the data array;
copy second data in the second sector of the block from the memory into a next sector of the way of the data array, wherein the next sector is consecutive to the start sector; and in response to the copy of the first and second data
update the tag array to identify the first and second data as being stored in the data array;
update the tag array to identify the first and second data as being stored in the way of the data array;
update the tag array to identify the start sector in the way of the data array; and
update the tag array to store a length that corresponds to a number of sectors that store the first and second data in the cache.

15. The system as recited in claim 14, wherein:
the block is a first block;
the way is a first way;
the start sector is a first start sector;
the next sector is a first next sector;
the length is a first length;
the number is a first number; and
the processor is further effective to:
copy third data in a third sector from the memory into a second start sector of a second way of the data array, wherein the third data is stored in the memory in a second block, and wherein the second block is distinct from the first block;
copy, by the processor, fourth data in a fourth sector from the memory into a second next sector of the second way of the data array, wherein the fourth sector is stored in the memory in the second block, the fourth sector is non-consecutive to the third sector, and the second next sector is consecutive to the second start sector;
update the tag array to identify the third and fourth data as being stored in the data array;
update the tag array to identify the third and fourth data as being stored in the second way in the data array;
update the tag array to identify the second start sector in the second way of the data array; and
update the tag array to store a second length that corresponds to a second number of sectors that store the third and fourth data in the cache.

16. The system as recited in claim 15, wherein the first and second ways are distinct.

17. The system as recited in claim 15, wherein:
the processor is effective to copy data in the first and second sectors by being effective to analyze the first block, copy data in the first and second sectors where data is stored in the memory, and not effective to allocate space in the data array for first remaining sectors different from the first and second sectors of the first block where data is not stored in the memory; and
the processor is effective to copy data in the third and fourth sectors by being effective to analyze the second block, copy data in the third and fourth sectors where data is stored in the memory, and not effective to allocate space in the data array for second remaining sectors different from the third and fourth sectors of the second block where data is not stored in the memory.

18. The system as recited in claim 14, wherein the data array is implemented using DRAM and the tag array is implemented using SRAM or DRAM.

19. A method for retrieving a copy of data in a block stored in a cache based on an address, wherein the address includes a tag field, a set index field, and a sector index field, the cache including a tag array and a data array, the tag array effective to map where data may be stored in the data array, the method comprising:
- comparing, by a processor, first tag data in the tag field, in a set identified in the set index field, with second tag data in another tag field in the tag array to produce a matching tag, wherein the matching tag is in a tag structure, and wherein the tag structure includes a sector bit vector field, a way field, a start sector field, and a length field that indicates a number of sectors where the copy of the data is stored in the cache;
- comparing, by the processor, sector bit vector data in the sector bit vector field of the tag structure with data in the sector index field of the address to determine that a copy of first data in a first sector from the block is stored in the cache;
- analyzing, by the processor, data in the way field to determine a way in the data array where the copy of the first data is stored;
- analyzing, by the processor, data in the start sector field to determine a starting sector in the data array where the copy of the block is stored;
- analyzing, by the processor, data in the length field to determine the number of sectors where the block is stored in the data array;
- retrieving, by the processor, the copy of the first data from the way, set, and starting sector of the data array, based on the length.

20. The method as recited in claim 19, wherein the address further comprises a sector offset field and the method further comprises retrieving the copy of the first data using data in the sector offset field.

* * * * *

UNITED STATES PATENT AND TRADEMARK OFFICE
CERTIFICATE OF CORRECTION

PATENT NO.         : 8,874,849 B2
APPLICATION NO.    : 13/498071
DATED              : October 28, 2014
INVENTOR(S)        : Solihin Page 1 of 4

It is certified that error appears in the above-identified patent and that said Letters Patent is hereby corrected as shown below:

On the Title Page, in Item (57), under "ABSTRACT", in Column 2, Line 3, delete "cache, in" and insert -- cache. In --, therefor.

On the Title Page, in Item (57), under "ABSTRACT", in Column 2, Line 6, delete "starling" and insert -- starting --, therefor.

On the Title Page, in Item (57), under "ABSTRACT", in Column 2, Line 10, delete "array, in" and insert -- array. In --, therefor.

In The Specification

In Column 1, Line 25, delete "to" and insert -- tag --, therefor.

In Column 1, Line 32, delete "from to" and insert -- from a --, therefor.

In Column 1, Line 51, delete "horn" and insert -- from --, therefor.

In Column 1, Line 56, delete "Way" and insert -- way --, therefor.

In Column 2, Line 60, delete "lot a" and insert -- for a --, therefor.

In Column 3, Line 9, delete "and to" and insert -- and a --, therefor.

In Column 3, Line 31, delete "front" and insert -- from --, therefor.

In Column 3, Line 37, delete "in to" and insert -- in tag --, therefor.

In Column 3, Line 38, delete "an" and insert -- same --, therefor.

Signed and Sealed this
Seventh Day of April, 2015

Michelle K. Lee
*Director of the United States Patent and Trademark Office*

CERTIFICATE OF CORRECTION (continued)
U.S. Pat. No. 8,874,849 B2

In Column 3, Line 58, delete "were" and insert -- where --, therefor.

In Column 3, Line 65, delete "was" and insert -- ways --, therefor.

In Column 4, Line 3, delete "then the" and insert -- then be --, therefor.

In Column 4, Line 10, delete "to field" and insert -- tag field --, therefor.

In Column 4, Line 19, delete "hit vector" and insert -- bit vector --, therefor.

In Column 4, Line 26, delete "tend" and insert -- and --, therefor.

In Column 4, Line 29, delete "the" and insert -- be --, therefor.

In Column 4, Line 52, delete "112, in" and insert -- 112. In --, therefor.

In Column 5, Line 1, delete "bad on historical data" and insert -- based on historical data, --, therefor.

In Column 5, Line 9, delete "IN" and insert -- in --, therefor.

In Column 5, Line 29, delete "ma" and insert -- may --, therefor.

In Column 5, Line 34, delete "102," and insert -- 102. --, therefor.

In Column 6, Line 5, delete "the to" and insert -- the tag --, therefor.

In Column 6, Line 60, delete "can b" and insert -- can be --, therefor.

In Column 6, Line 67, delete "multiple, distinct," and insert -- multiple distinct --, therefor.

In Column 7, Line 7, delete "for" and insert -- for, --, therefor.

In Column 7, Line 11, delete "at" and insert -- of --, therefor.

In Column 7, Line 12, delete "flays columns" and insert -- ways/columns --, therefor.

In Column 7, Line 13, delete "distinct," and insert -- distinct --, therefor.

In Column 7, Line 25, delete "horn" and insert -- from --, therefor.

In Column 7, Line 36, delete "fir tags" and insert -- for tags --, therefor.

In Column 7, Line 39, delete "seine" and insert -- some --, therefor.

In Column 7, Line 41, delete "some" and insert -- in some --, therefor.

CERTIFICATE OF CORRECTION (continued)
U.S. Pat. No. 8,874,849 B2

In Column 7, Line 54, delete "More" and insert -- more --, therefor.

In Column 7, Line 56, delete "and or" and insert -- and/or --, therefor.

In Column 8, Line 8, delete "as sector" and insert -- a sector --, therefor.

In Column 8, Line 13, delete "204" and insert -- 204, --, therefor.

In Column 8, Line 62, delete "to" and insert -- to, --, therefor.

In Column 8, Line 64, delete "102" and insert -- 302 --, therefor.

In Column 9, Line 3, delete "oil" and insert -- of --, therefor.

In Column 9, Line 13, delete "40" and insert -- 408 --, therefor.

In Column 9, Line 32, delete "etc)" and insert -- etc.) --, therefor.

In Column 9, Line 47, delete "interlaces" and insert -- interfaces --, therefor.

In Column 9, Line 62, delete "such is" and insert -- such as --, therefor.

In Column 10, Line 29, delete "as communication" and insert -- a communication --, therefor.

In Column 10, Line 31, delete "as" and insert -- a --, therefor.

In Column 11, Line 1, delete "lot" and insert -- for --, therefor.

In Column 11, Line 6, delete "a is" and insert -- as is --, therefor.

In Column 11, Line 16, delete "an that if at" and insert -- art that if a --, therefor.

In Column 11, Line 24, delete "churn" and insert -- claim --, therefor.

In Column 11, Line 29, delete "and or in" and insert -- and/or "an" --, therefor.

In Column 11, Line 30, delete "at least one" and insert -- "at least one" --, therefor.

In Column 11, Line 32, delete "as" and insert -- a --, therefor.

In Column 11, Lines 47-48, delete "has mg skill in the art is" and insert -- having skill in the art would --, therefor.

In Column 11, Line 61, delete "in the in" and insert -- in the art --, therefor.

CERTIFICATE OF CORRECTION (continued)
U.S. Pat. No. 8,874,849 B2

In Column 12, Line 6, delete "third middle thud" and insert -- third, middle third --, therefor.

In Column 12, Line 8, delete ""up to" and insert -- "up to," --, therefor.

In Column 12, Line 8, delete "less" and insert -- "less --, therefor.

In Column 12, Line 11, delete "ranges a" and insert -- ranges as --, therefor.

In Column 12, Line 19, delete "and in" and insert -- and are --, therefor.

In Column 12, Line 20, delete "limiting" and insert -- limiting, --, therefor.